United States Patent [19]

Hijikata

[11] Patent Number: 5,264,708
[45] Date of Patent: Nov. 23, 1993

[54] FLAME DETECTOR
[75] Inventor: Yasuhiro Hijikata, Iruma, Japan
[73] Assignee: Yokogawa Aviation Company, Ltd., Iruma, Japan
[21] Appl. No.: 978,111
[22] Filed: Nov. 18, 1992
[30] Foreign Application Priority Data
   Jan. 31, 1992 [JP] Japan .................. 4-046027
[51] Int. Cl.$^5$ ........................... H01L 3/14
[52] U.S. Cl. ...................... 250/554; 340/578
[58] Field of Search ........... 250/554, 214 R, 214 C; 340/577, 578

[56] References Cited
U.S. PATENT DOCUMENTS 4,464,575 8/1984 Cholin et al. .................. 340/578
4,547,673 10/1985 Larsen et al. .................. 250/554

Primary Examiner—David C. Nelms
Attorney, Agent, or Firm—Moonray Kojima

[57] ABSTRACT

An inexpensive flame detector capable of self checking for internal faults, and comprising a detecting photodiode used for detection of a flame, a checking photodiode used for checking function a light source optically coupled to the checking photodiode, an operational amplifier having a feedback resistor connected between the output terminal and non-inverting input terminal thereof, and a decision circuit for receiving the output signal from the amplifier. The checking photodiode is optically isolated from the detecting photodiode and is connected in series, in one embodiment, and in parallel, in another embodiment, with the detecting photodiode. The light source is switched ON and OFF at regular time intervals. The detecting photodiode is connected to the non-inverting input thermal of the operational amplifier. Alternatively, both photodiodes are connected to the non-inverting input terminal. The decision circuit judges the condition of the flame and the fault condition of the internal components of the flame detector. The detector is simple in structure, having no moving parts; has long life; is inexpensive to manufacture; and is highly reliable.

5 Claims, 5 Drawing Sheets

FLAME DETECTOR

BACKGROUND OF THE INVENTION

1. Field of Invention

This invention relates to a flame detector which detects the presence or absence of a flame by use of a light receiving device acting as the flame sensor.

2. Description of the Prior Art

One conventional type of flame detection system uses a mechanical shutter which is mounted between a light receiving device and the flame to provide a self checking function. Also, techniques are known for enhancing the reliability of the shutter mechanism, as described, for example, in Japan Laid Open Patent Nos. 122,530/1986 and 122,531/1986. In particular, in one known flame detector, a mechanical shutter, which is opened and closed at regular intervals of time, is disposed between the flame to be inspected and a flame sensor used to detect the presence or absence of the flame. In another known flame detector, a liquid crystal cell, which is switched between a transparent mode and an opaque mode at regular time intervals, is placed between the flame and the flame sensor. In a further known flame detector, a shutter cell, made of a material which transmits light, is placed between the the flame and the flame sensor. A magnetic fluid of a color which is capable of blocking light is sealed in the shutter cell, and magnets for controlling the position of the magnetic fluid inside the cell are disposed on opposite sides of the cell In these conventional devices, the flame detector receives a given recurrent signal from the flame sensor. The detector has a fail-safe detector circuit which processes this signal in predetermined manner to constantly detect the presence or absence of a flame and of trouble in the flame sensor even during the operation of the device.

The conventional flame detectors of the type described have the following problems. (1) The structure of such devices requires an excessive number of components, such as the liquid crystal cell or the shutter cell. In addition, a component for controlling such excessive components, is required. This makes such prior art devices complex and bulky. Also, the devices are costly. (2) The liquid crystal cell and the shutter Cell are less likely to fail than the mechanical shutter. However, the failure rate is still unfavorably high, because such cells must be constantly switched ON and OFF. (3) When a mechanical shutter is used, it is not necessary to use any optical component, which itself is subject to leakage and aging, in the path between the flame and the flame sensor. However, when a liquid crystal cell or shutter cell is used, it is necessary to place the cell or like in the optical path between the flame and sensor. Leakage in the optical components and deterioration in transparency causes deterioration in detection sensitivity.

Thus, there is room in the art for improvements in flame detectors.

SUMMARY OF THE INVENTION

An object of the invention is to overcome the foregoing and other deficiencies and disadvantages of the prior art.

Another object is to provide an inexpensive flame detector which is simple in structure, has long life, is reliable and has a self checking function to detect faults in its internal components.

The foregoing and other objects and features of the invention are attained by the invention which encompasses a flame detector comprising a detecting photodiode used as a light receiving device; a checking photodiode connected in series with the detecting photodiode and optically isolated from the detecting photodiode; a light source which is optically coupled to the checking photodiode and switched ON and OFF at regular time intervals; an arithmetic means to which the detecting photodiode is connected; and a decision circuit which receives the output signal from the arithmetic means and judges the condition of the flame and the condition of various internal components of the flame detector, whereby the detector detects the presence or absence of the flame and also self inspects for faults in any internal components thereof.

Another embodiment of the invention comprises a detecting photodiode used as a light receiving device; a checking photodiode connected in parallel with the detecting photodiode and optically isolated from the detecting photodiode; a light source which is optically coupled to the checking photodiode and switched ON and OFF at regular time intervals; an arithmetic means to which the detecting photodiode is connected; and a decision circuit which receives the output signal from the arithmetic means and judges the condition of the flame, and the condition of various internal components of the flame detector, whereby the detector detects the presence or absence of the flame and also self inspects for faults in any of the internal components thereof.

In one aspect of the invention, a photodiode acting as a flame sensor is connected to an operational amplifier. A checking photodiode is optically isolated from the detecting photodiode. A light source which is switched ON and OFF at regular time intervals is optically coupled to the checking photodiode. The output from the operational amplifier is judged by a decision circuit, as to presence or absence of a flame, and also as to the fault condition of the components of the flame detector.

DESCRIPTION OF THE PREFERRED EMBODIMENTS

Figure 1:
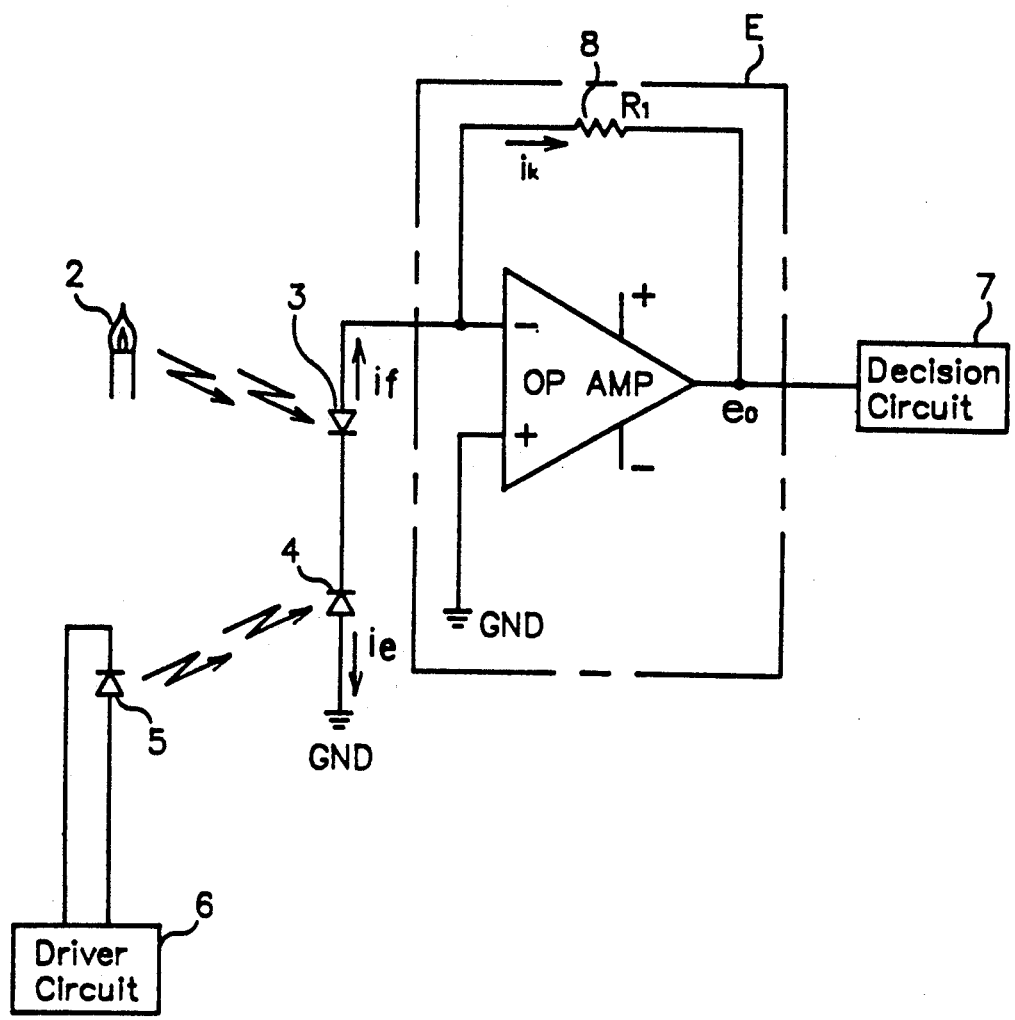
FIG. 1 is a diagram depicting an illustrative embodiment of the invention.

Referring to FIG. 1, there is shown an illustrative flame detector comprising an arithmetic means E, including an operational amplifier 1, and a feedback resistor 8, connected between the output terminal and the non-inverting input terminal of the amplifier 1; and a photodiode 3, acting as a flame sensor which detects the condition of flame 2, connected to the non-inverting input terminal of amplifier 1. As described later, both photodiode 3, used for detecting the flame, and checking photodiode 4, may be connected to the non-inverting input terminal of the amplifier 1. The inverting input terminal of amplifier 1 is grounded as shown.

Photodiode which is used for checking purposes, is optically isolated from flame detecting photodiode 3. In FIG. 1, the two photodiodes 3, 4 are connected in opposite senses and in series circuit. The other end of checking photodiode 4 is grounded.

Checking photodiode 4 is optically coupled to a light source 5 which can be a light emitting diode, for example. Light source 5 is switched ON and OFF periodically by a driver circuit 6. For example, light source 5 is switched ON for 1 second, and switched OFF for 3 seconds.

A decision circuit 7 is connected to the output terminal of operational amplifier 1 to receive output voltage $e_O$ from amplifier 1. Decision circuit 7 judges the condition of the flame (to determine whether it is present or absent) and judges the condition of the various components of the flame detector device (to determine whether any of the components has any faults therein). Feedback resistor 8 has a resistance of $R_f$.

If the internal components of the flame detector are all n a normal (i.e non-fault) condition, the output voltage $e_O$ from amplifier 1 is repeatedly switched between a high level and a low level as light source 5 is switched ON and OFF. If a fault or trouble occurs, it is detected by connecting the output of amplifier 1 to the base of a transistor and judging the output of the transistor. Also, the flame is detected by inverting the polarity of voltage $e_0$ and connecting the output of amplifier 1 to the base of a transistor and then judging the output from the transistor.

Figure 2:
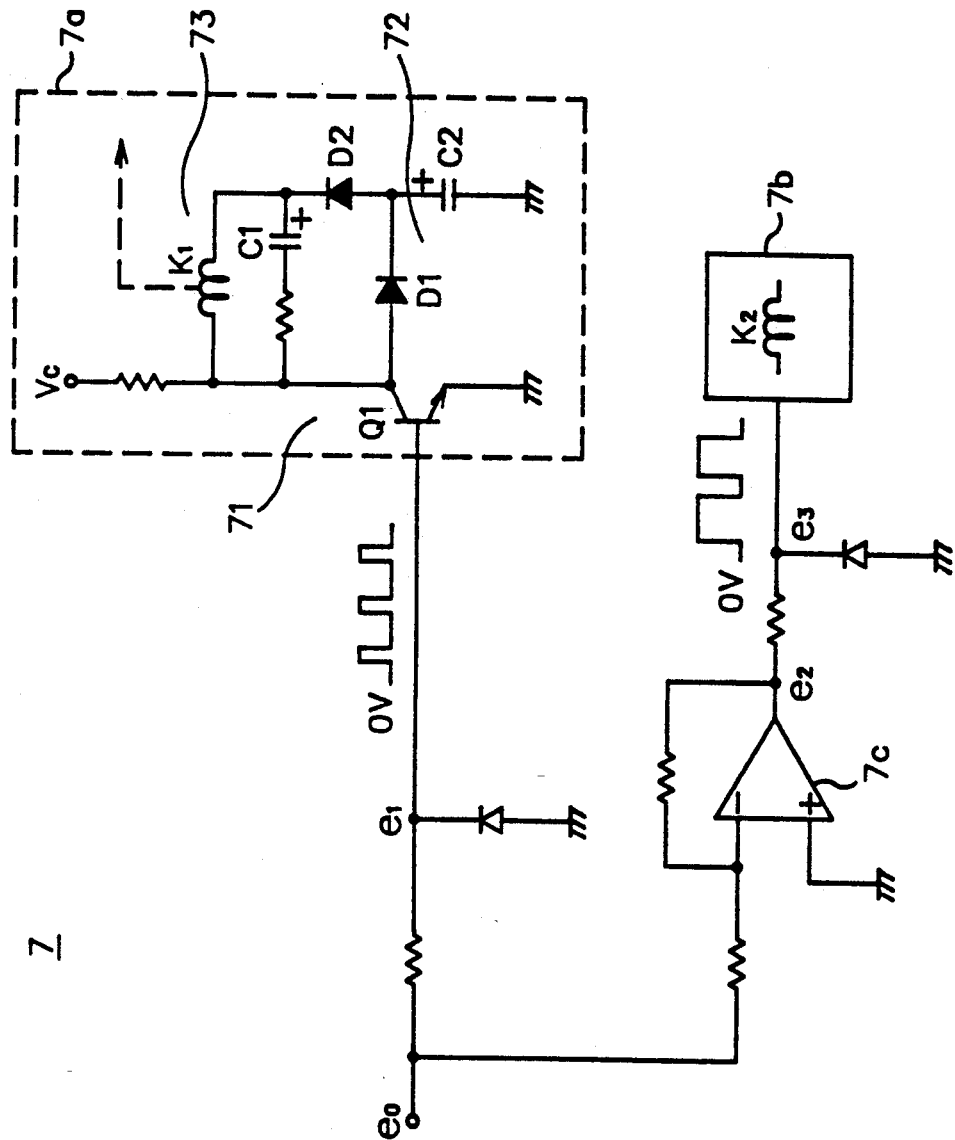
FIG. 2 is a circuit diagram depicting the decision circuit of FIG. 1.

Referring to FIG. 2, decision circuit 7 (of FIG. 1) comprises a trouble detector portion 7a, a flame detector portion 7b, and a polarity inverter 7c that inverts the polarity of voltage $e_0$ and supplies the inverted voltage to flame detector portion 7b. Trouble detector portion 7a is so designed that it can keep energizing a relay only when the output from operational amplifier 1 is in the from of pulses produced at regular time intervals. The trouble detector portion judges the condition of the internal components of the flame detector device and judges it to be normal only when the input voltage $e_0$ takes the form of pulses of a given period. The polarity of voltage $e_0$ is inverted by polarity inverter 7c. The flame detector portion 7b judges the condition of the flame to be normal only when the output signal from the polarity inverter 7c takes the form of pulses produced at regular time intervals.

Trouble detector portion 7a and flame detector portion 7b may have the same circuit configuration, which need not be of any special design, and may be of a conventional pulse detector circuit.

Figure 3:
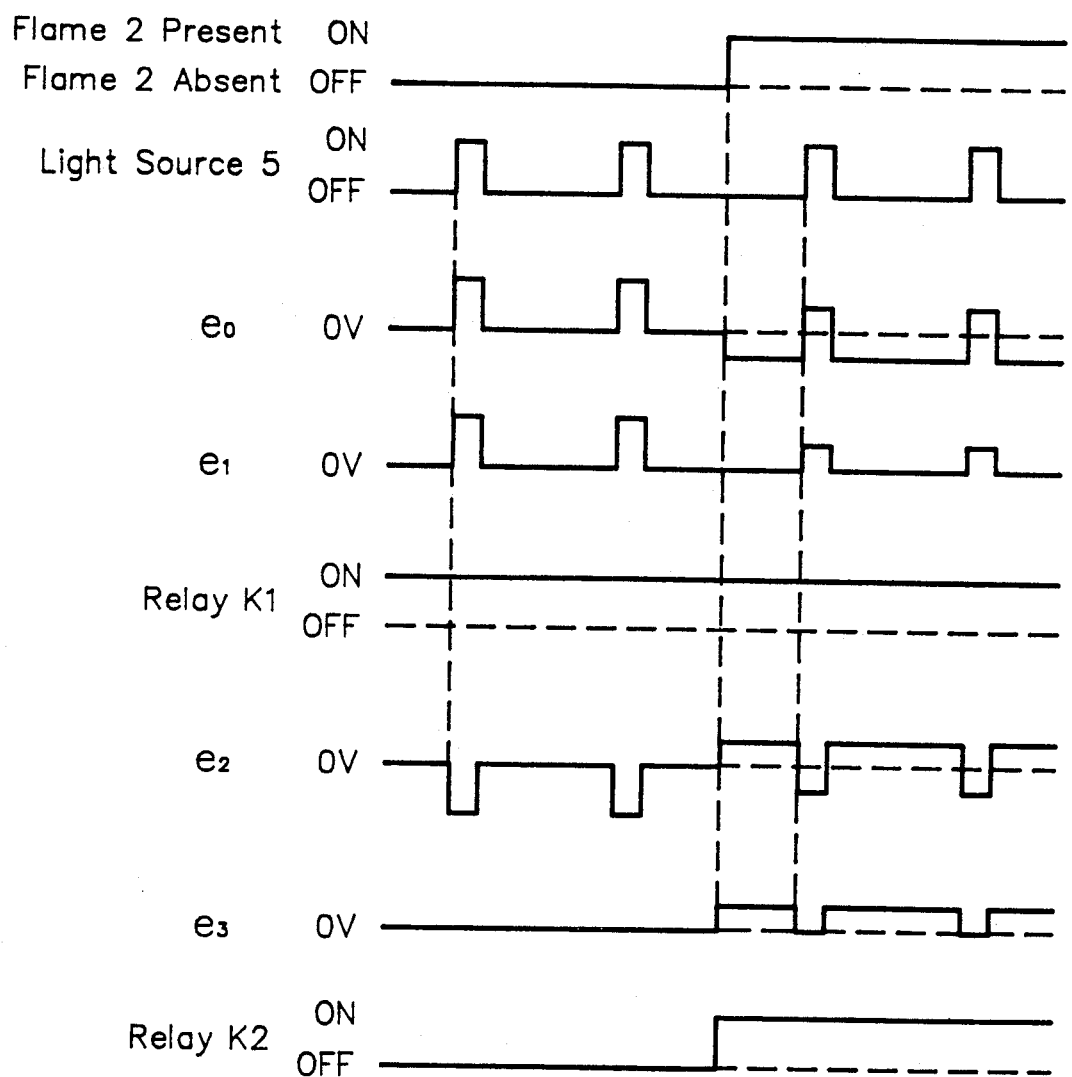
FIGS. 3 and 4 are time charts used to illustrate the operation of the circuits of FIGS. 1 and 2.
Figure 4:
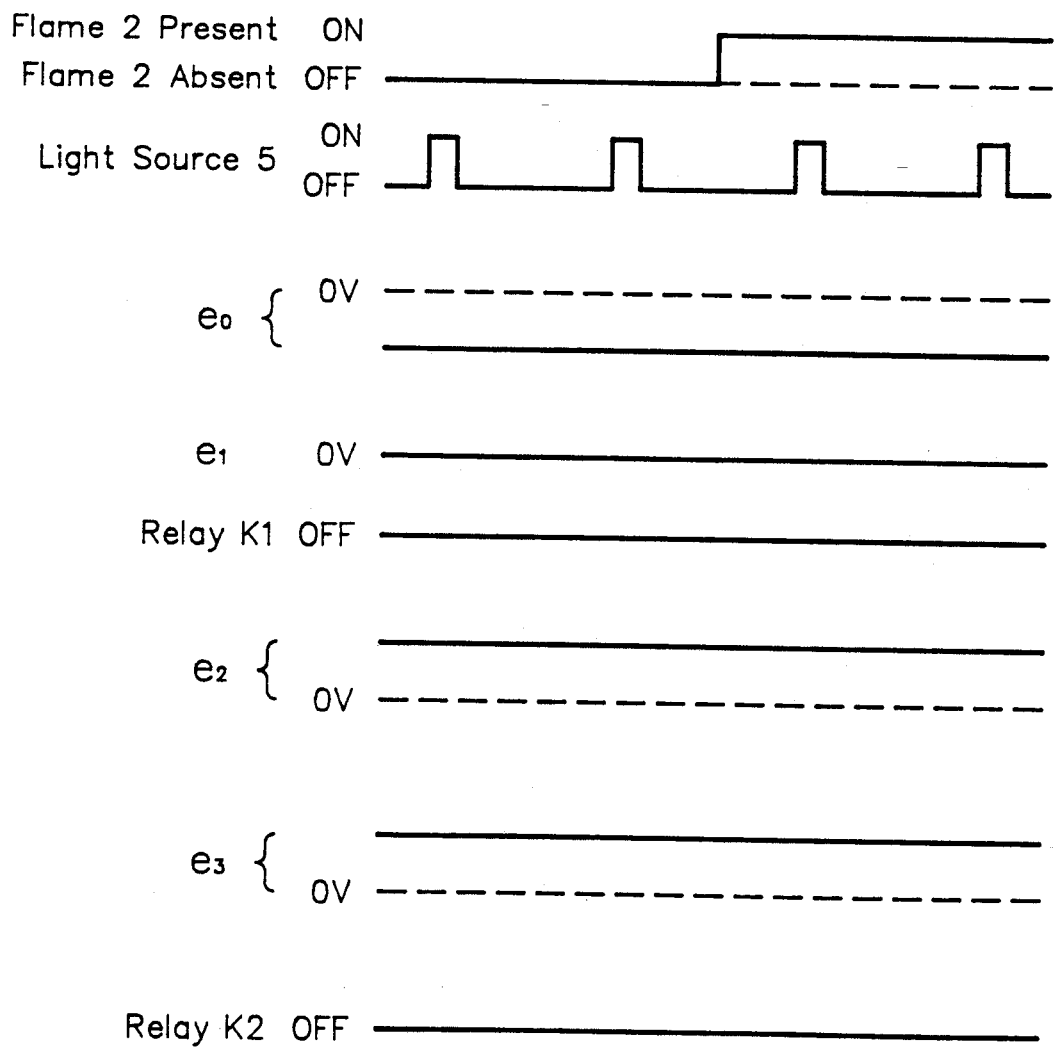

One example of a circuit configuration of trouble detector portion 7a is shown in FIG. 2 and comprises a power amplifier 71, including a transistor Q1, a half-wave rectifier portion 72, including a diode D1 and a capacitor C2, and an output portion 73, including a relay K1. The flame detector portion 7b is indicated solely by K2, in conformance with the description in FIGS. 3, 4, but is understood to comprise a circuit configuration similar to that of portion 7a.

The output signal from amplifier 1, in the form of pulses, is applied to the base of transistor Q1, so that transistor 01 is repeatedly turned ON and OFF. Correspondingly, capacitor C2 is repeatedly electrically charged and discharged. This energizes relay K1 (and K2 of flame detector portion 7b). A desired signal indicating detection or operation is obtained at K1 (and K2) based on the operation of the relay.

The operation of the detector portion is as follows. (1) When transistor Q1 is not conducting, capacitor C2 is charged. (2) When transistor Q1 is biased into conduction, the collector is reduced down to ground potential. The electrical current released from capacitor C2 flows into the circuit formed by relay K1 and capacitor C1 via diode D2. When transistor Q1 is not conducting, and capacitor C2 is electrically charged, capacitor C1 maintains relay K1 energized. (3) Operation step (1) is repeated. That is, when transistor Q1 is driven into cutoff, capacitor C2 is charged. Subsequently, operation steps (2) and (3) are carried out. (4) In this manner, operation steps (1) and (2) and (3) are repeated.

Let $e_1$ be the input voltage to trouble detector portion 7a of decision circuit 7. Let $e_2$ be the output voltage from inverter 7c. Let $e_3$ be the input voltage to flame detector portion 7b. The voltages produced at various parts of decision circuit 7 when the flame detector device is in a normal condition, are shown in the time chart of FIG. 3. The voltages produced at the various parts of decision circuit 7 when the voltage $e_O$ is short circuited and is negative (i.e. when there is a fault or defect in one or more of the internal components of the flame detector device) are shown in the time chart of FIG. 4.

A photodiode acts as a current source when light falls on the photodiode. Let $i_f$ be the current produced by flame detecting photodiode 3. Let $i_c$ be the current produced by checking photodiode 4. The decision operations performed by decision circuit are as follows.

1. When flame 2 is absent and light source 5 is OFF, $$i_f = i_c = 0 \tag{1}$$

Thus, electrical current ik flowing into feedback resistor 8 is $$i_k = i_f - i_c = 0 \tag{2}$$

, Thus, voltage $e_0$ at the output terminal of amplifier 1 is $$e_0 = 0 \tag{3}$$

2. When flame 2 is present, but light source 5 is OFF $$i_f > 0, i_c = 0 \tag{4}$$

Current $i_k$ flowing into feedback resistor 8 at this time is $$i_k = i_f - i_c = i_r \tag{5}$$

Voltage $e_O$ at the output terminal of amplifier 1 is $$e_O = -R_f i_f < 0 \tag{6}$$

3. From equations (1) and (2), the following decisions can be judged.

if $e_0 < 0$, flame is present; if $e_0 \geq 0$, flame is absent (7)

If any internal component of the flame detector device has a defect or fault, a decision is judged as follows.

4. If light source 5 is OFF, and if flame detecting photodiode 3, feedback resistor 8, or operation amplifier 1 has a fault or defect, voltage $e_O$ takes the states shown in Table 1 below.

TABLE 1

| Trouble | Voltage $e_0$ (when flame is absent) | Voltage $e_0$ (when flame is present) |
| --- | --- | --- |
| Detecting photo-diode 3 is shorted | 0 V | 0 V |
| Detecting photo-diode 3 is open | Uncertain | Uncertain |

TABLE 1-continued

| Trouble | Voltage $e_0$ (when flame is absent) | Voltage $e_0$ (when flame is present) |
|---|---|---|
| Feedback resistor 8 is shorted | 0 V | 0 V |
| Feedback resistor 8 is open | uncertain | uncertain |
| Operational amplifier 1 has fault | uncertain | uncertain |

When a flame is absent, if the state of voltage $e_0$ indicates the presence of a flame, then it follows that a very dangerous situation is at hand. For example, unburned fuel may permeate the inside of the container, or the burner has a flame. In either case, there exists the danger of an explosion.

The invention, advantageously, detects such trouble by itself and thus insure safety. In Table 1, the condition in which the flame is absent and the voltage $e_0$ is uncertain, i.e. $e_0 < 0$ is considered to be dangerous. Thus, this condition must be detected, and is detected by the invention.

5. Where checking light source 5 is turned ON and OFF at regular intervals of time, when the source is turned OFF, the same operation as above step 4 is performed.

6. When checking light source 5 is turned ON, the operation is different, depending on whether light from the flame is absent or present.

A. If light from the flame is absent, the relations $i_f = 0$, and $i_c > 0$ hold. Thus, $$i_k = i_f - i_c = -i_c \quad (8)$$

Therefore, we have $$e_O = R_f i_c > 0 \quad (9)$$

B. If the light from the flame is present, then the relationships $i_f > 0$ and $i_c > 0$ hold. Thus, $$i_k = i_f - i_c \quad (10)$$

This leads to the relation $$e_0 = -R_f(i_f - i_c) \quad (11)$$

If the brightness of checking light source 5 is so adjusted that the relation $i_c > i_f$ is satisfied, then we obtain $$e_O > 0 \quad (12)$$

Based on the foregoing relations, various forms of faults or troubles in or with the components of the flame detector device are summarized in Table 2 below.

TABLE 2

| Trouble | Voltage $e_0$ (When flame is absent) | Voltage $e_0$ (when flame is present) |
|---|---|---|
| Detecting photodiode 3 is shorted | $i_c \cdot R_f > 0$ | $i_c \cdot R_f > 0$ |
| Detecting photodiode 3 is open | uncertain | uncertain |
| Feedback resistor 8 is shorted | 0 V | 0 V |
| Feedback resistor 8 is open | uncertain | uncertain |
| Operational amplifier 1 has a fault | uncertain | uncertain |
| Checking photodiode 4 is shorted | $-i_f \cdot R_f < 0$ | 0 V |
| Checking photodiode 4 is open | uncertain | uncertain |
| Light source 5 does not emit light | $-i_f \cdot R_f < 0$ | 0 V |
| Light source 5 is continuously lit | $-i_f \cdot R_f > 0$ (flame is not detectable) | $i_c \cdot R_f > 0$ |
| Light source 5 emits less intensely | $i_k \cdot R_f < 0$ | $i_c \cdot R_f > 0$ |

7. When checking light source 5 is lit, if $e_0 \leq 0$, the flame detector has a fault or defect. If $e_0 > 0$, and if the detector is judged to be normal, then no trouble is detected for any of the following reasons (1) The flame detecting photodiode 3 has a fault. (b) The checking light source 5 is continuously lit. (c) The illuminating power of the checking light source 5 has decreased. (d) The voltage is uncertain.

In the above states (a) and (b), the flame cannot be detected, and the relation $e_0 \geq 0$ holds at all times. In the above state (c), the flame can be detected normally. When a flame is present, light source 5 is lit. Since the relation $e_0 < 0$ holds, trouble is detected. In above state (d), if $e_0 > 0$, then the detection of a flame is not possible. If $e_0 \leq 0$, then trouble is detected.

As described, in accordance with the invention, when a flame is absent, the situation is very dangerous. In this condition, the relation $e_0 < 0$ holds. When a flame is present, trouble is detected. In this manner, a flame detector which is capable of self checking is realized.

Figure 5:
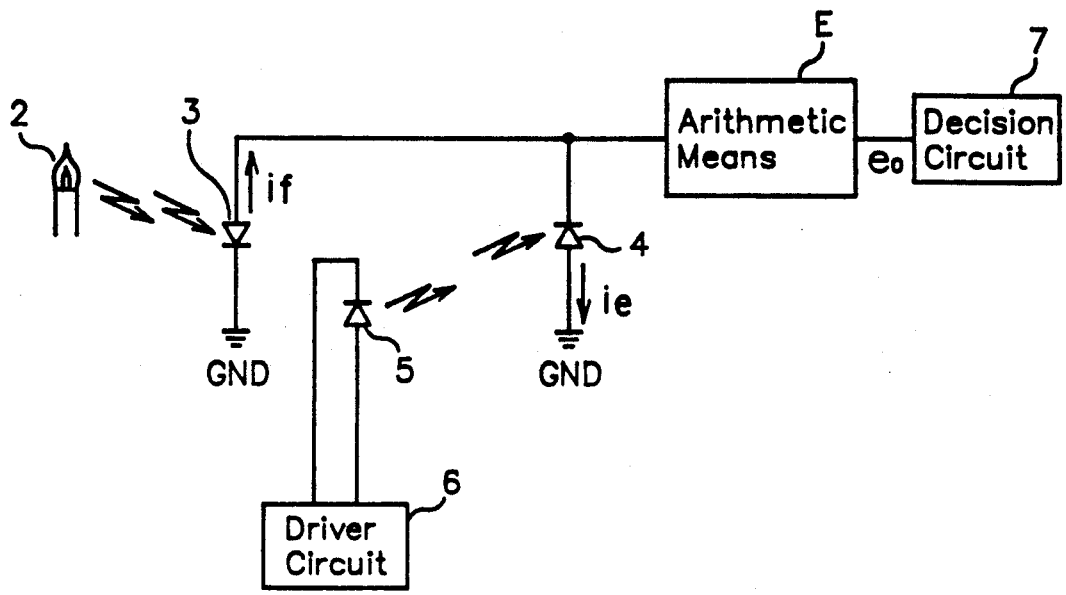
FIG. 5 is a diagram depicting another illustrative embodiment of the invention.

It is to be understood that the invention is not limited to the above embodiment. FIG. 5 depicts a modification of the above embodiment of FIG. 1, wherein detecting photodiode 3 and checking photodiode 4 are connected in parallel, rather than in series as in FIG. 1. Both photodiodes 3,4 are connected to the non-inverting input terminal of amplifier 1.

Figure 6:
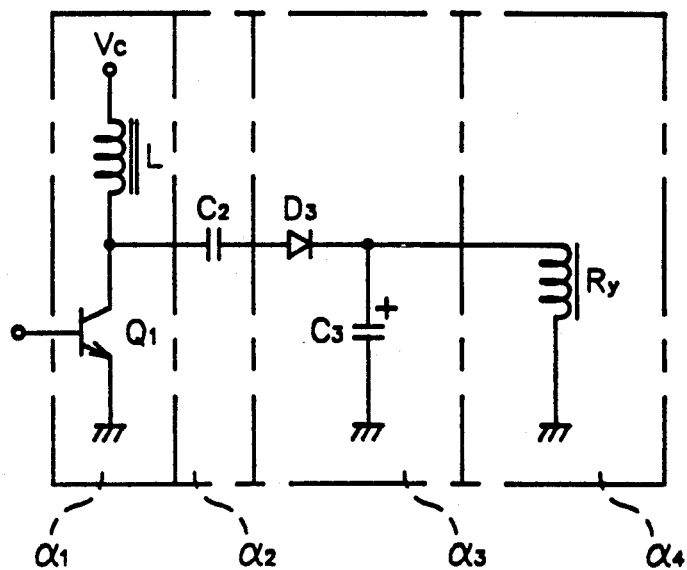
FIG. 6 is a circuit diagram depicting another embodiment of the invention.

The trouble detecting portion and the flame detector portion may be those shown in FIG. 2. However, these portions may also be as constructed in FIG. 6, wherein a power amplifier portion $\alpha_1$ has a transistor $Q_1$, an inductance L is connected to the collector of transistor $Q_1$, a decision rectifier portion $\alpha_3$ including a diode $D_3$ and a capacitor $C_3$ connected to the power amplifier $\alpha_1$ by an AC coupling portion $\alpha_2$ including a capacitor $C_2$; and an output portion $\alpha_4$ including an output relay, which is activated by the output from the decision rectifier portion $\alpha_3$.

The decision circuit 7 is of a discrete type and may comprise an arithmetic means, such as a microcomputer. In this case, the arithmetic means batches and executes the above functions only if voltage $e_O$ from operational amplifier 1 takes the form of pulses produced at regular intervals. Specifically, information used to judge the fault condition of the components and the condition of the flame, that s whether normal or not, s stored in a memory. The arithmetic means, such as the microcomputer, makes given comparisons and performs given calculations according to data read from the memory. Then, the arithmetic means constantly judges the fault condition of the internal components of the flame detector device, and the condition of the flame. If necessary, a signal indicating the results of the judging is produced. In this manner, the foregoing flame detector device is realized.

The invention has many advantages, such as the following. Because the novel flame detector of the invention has no moving parts, product life is greatly increased, and reliability is high. In addition, the cost is greatly decreased. Also, the invention has a self checking function to check the fault condition of its internal components. The invention has a simple structure comprising two photodiodes used for flame detection and inspection, together with one light source. Since no other extra components, such as required in conventional devices, is present, the invention is not complex or bulky. Also, since the invention does not require an optical component between the flame and the light receiving device, it is not necessary to provide against contamination or deterioration of transparency which would normally accompany such optical component.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A flame detector device comprising
   a detecting photodiode for receiving light from a flame to be detected;
   a checking photodiode connected in series with said detecting photodiode and optically isolated therefrom;
   a light source optically coupled to said checking photodiode and switched ON and OFF at regular time intervals;
   an arithmetic means connected to said detecting photodiode; and
   decision circuit means for receiving an output signal from said arithmetic means and for judging the condition of said flame and the fault condition of various aforementioned components of said flame detector device so that said flame detector device performs the functions of flame detection and of self inspection for faults.

2. A flame detector device comprising
   a detecting photodiode for receiving light from a flame to be detected;
   a checking photodiode connected in parallel with said detecting photodiode and optically isolated therefrom;
   a light source optically coupled to said checking photodiode and switched ON and OFF at regular time intervals;
   an arithmetic means connected to said detecting photodiode; and
   decision circuit means for receiving an output signal from said arithmetic means and for judging the condition of said flame and the fault condition of various aforementioned components of said flame detector device so that said flame detector device performs the functions of flame detection and of self inspection for faults.

3. The device of claim 1 or 2, wherein said arithmetic means comprises an operational amplifier having an output terminal, a non-inverting input terminal and an inverting input terminal, and a feedback resistor connected between said output terminal and said non-inverting input terminal; and wherein both said detecting photodiode and said checking photodiode, or in the alternative, said checking photodiode alone, is connected to said non-inverting input terminal, and wherein said decision circuit means is connected to said output terminal.

4. The device of claim 1 or 2, wherein said decision circuit means comprises
   trouble detector means for receiving output signal from said arithmetic means and for judging the aforementioned components of said flame detector device to be normal when the received signal takes the form of pulses produced at regular time intervals;
   polarity inverter means for receiving output signal from said arithmetic means and for inverting the polarity of said output signal; and
   flame detector means for judging the condition of said flame to be normal when a signal obtained from said polarity inverter means takes the form of pulses produced at regular time intervals.

5. The device of claim 4, wherein said decision circuit means comprises a memory for storing information used to judge the fault condition of the aforementioned components of said flame detector device, and means for accessing said memory to judge the fault condition and the flame condition according to the stored information in said memory.

* * * * *